May 22, 1934.   N. M. LOWER   1,959,483
BRAKE AND CLUTCH CONTROL MECHANISM
Filed Sept. 1, 1928   4 Sheets-Sheet 2
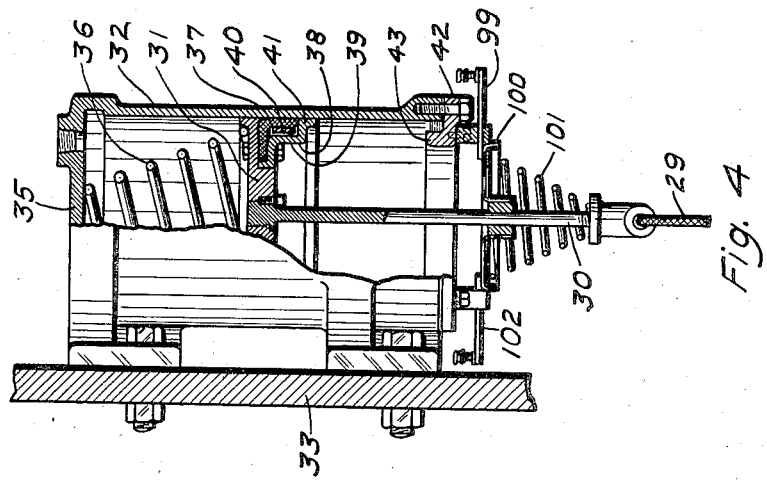
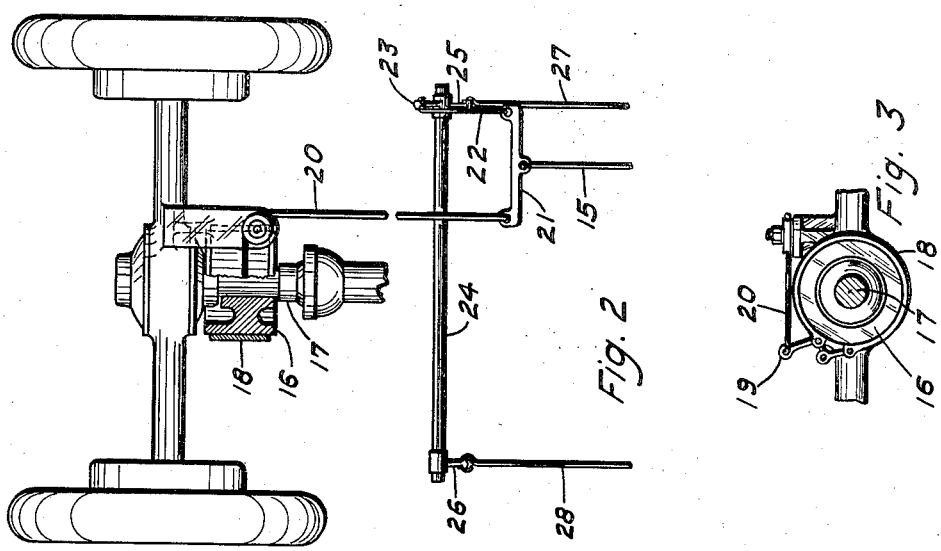
INVENTOR
Nathan M. Lower May 22, 1934.  N. M. LOWER  1,959,483
BRAKE AND CLUTCH CONTROL MECHANISM
Filed Sept. 1, 1928   4 Sheets-Sheet 3

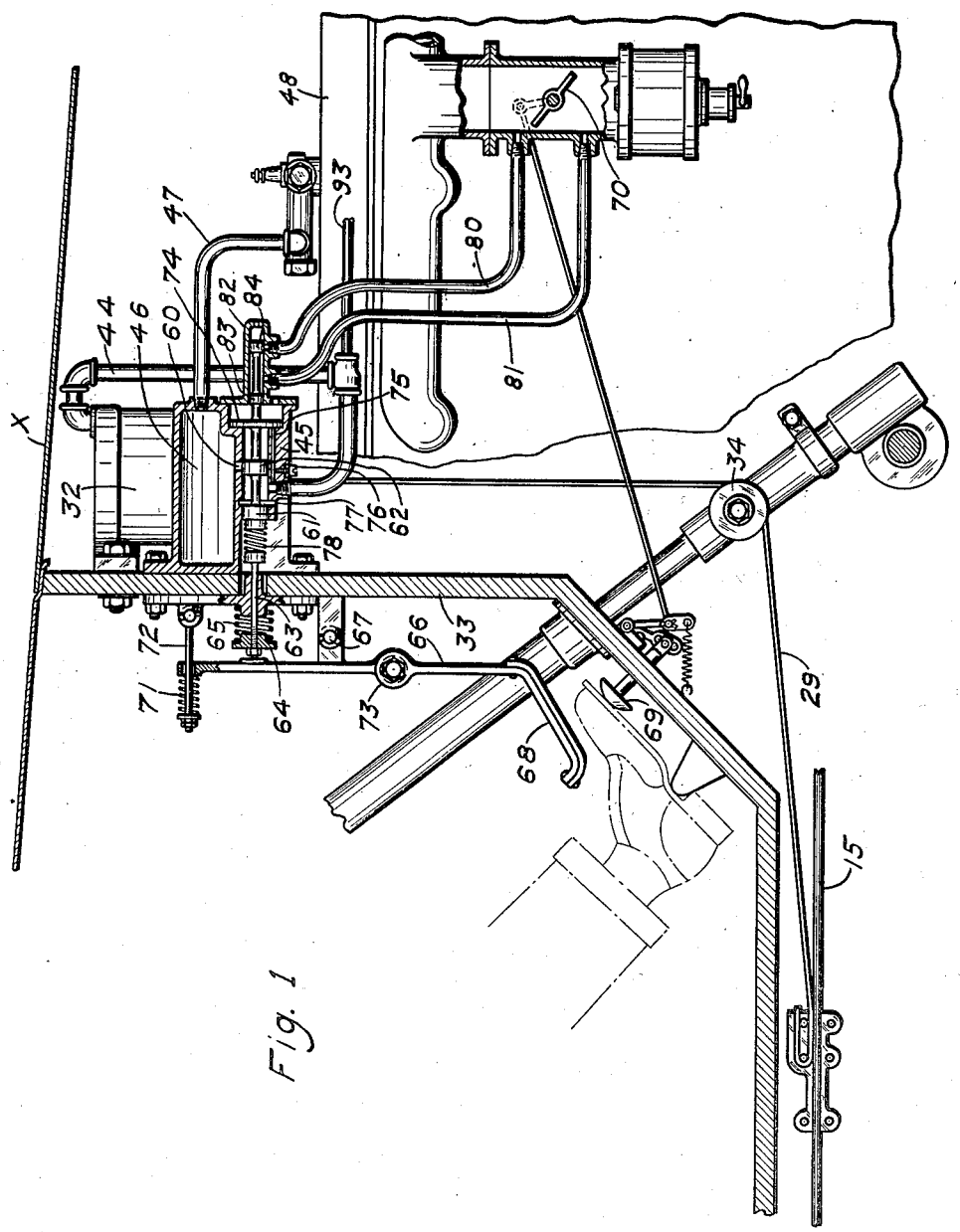

INVENTOR
Nathan M Lower

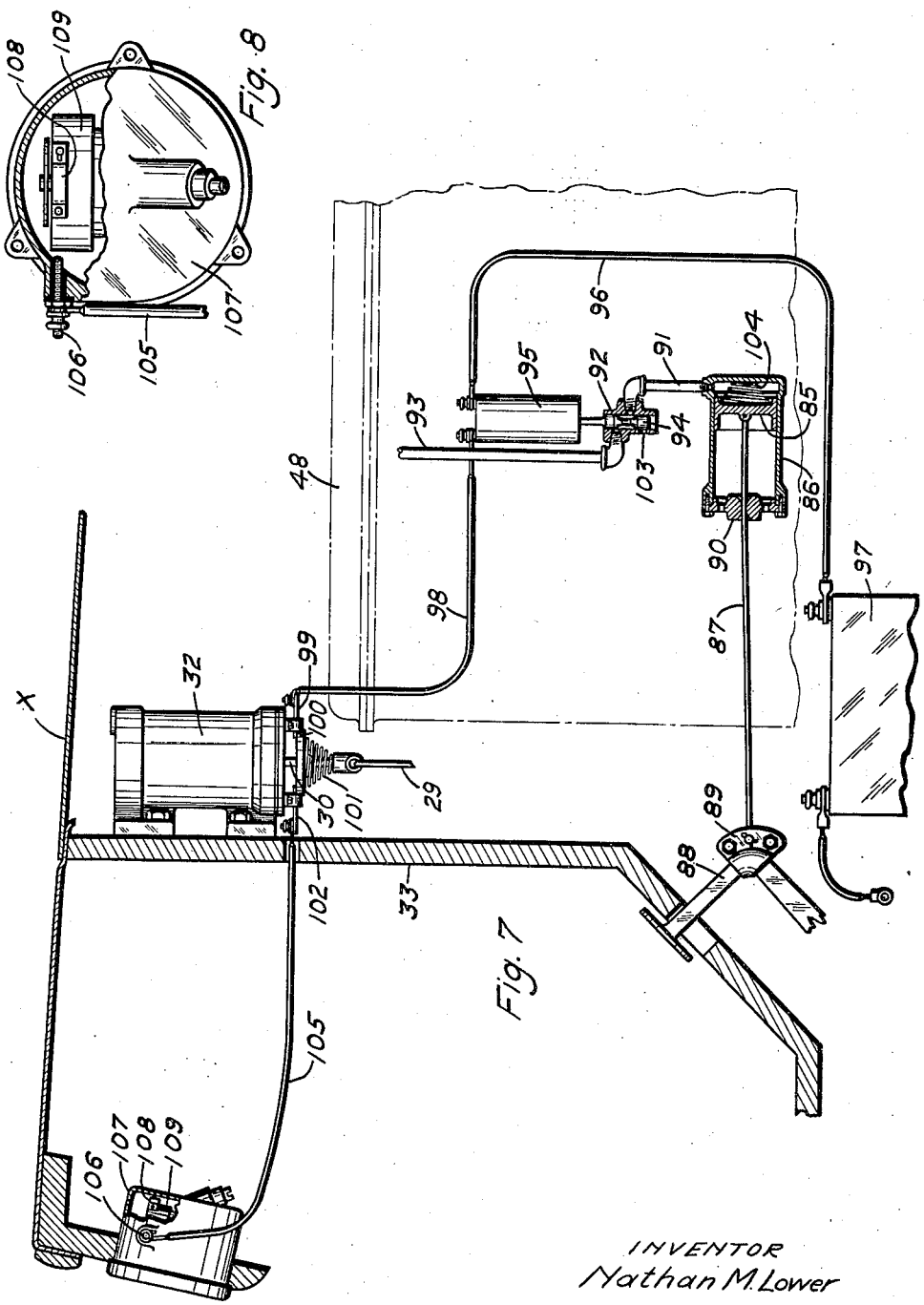

Patented May 22, 1934

1,959,483

UNITED STATES PATENT OFFICE 1,959,483

BRAKE AND CLUTCH CONTROL MECHANISM

Nathan M. Lower, Pittsburgh, Pa.

Application September 1, 1928, Serial No. 303,508

7 Claims. (Cl. 192—13)

This invention relates to power mechanism for controlling the brakes and clutch of automotive vehicles, and is especially applicable to vehicles which are driven by internal combustion engines.

The major objects of the invention are to secure simplicity of control and reliability of action, and to insure an adequate fuel supply to the engine during the operation of the brake mechanism.

Other objects secured are brought out in the description of the mechanism.

While various other forms of the construction may come within the scope of the invention, a desirable embodiment of it is hereinafter described, and is illustrated in the accompanying drawings, in which:

Fig. 1 is a detail, vertical, longitudinal, section of an automobile with portions of the improved device applied thereto and shown partly in section and partly in elevation;

Fig. 2 is a detail plan view, partly in section, of the running gear of an automobile and its brake system;

Fig. 3 is a detail section of the brake mechanism shown in Fig. 2;

Fig. 4 is a detail, partly in side elevation and partly in longitudinal section of an atmosphere motor for actuating the brakes, attached to a supporting portion of the vehicle;

Fig. 7 is a view similar to Fig. 1 showing the control mechanism applied to the vehicle, partly in elevation and partly in section; and Fig. 8 is a detail partly in elevation and partly in section of the speedometer of the vehicle.

Figs. 1 and 2 are not intended to indicate a single plane of view as various parts of the device may be shifted with reference to the vehicle to take advantage of the space available for their application.

Figure 6:
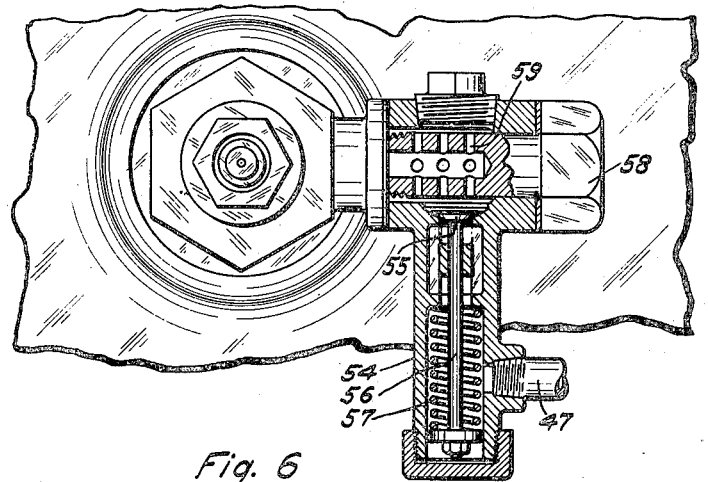
Fig. 6 is a detail plan view, partly in section, of the parts shown in Fig. 5.
Figure 5:
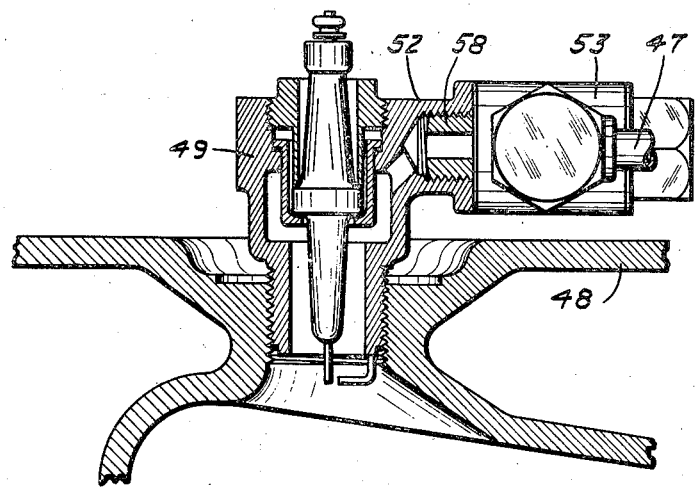
Fig. 5 is a detail, longitudinal section of an internal combustion engine and suction connection associated therewith.

The invention may be used in connection with any form of brake mechanism, being connected with the usual pull rod 15 which is ordinarily operated by a pedal lever and to which rod such a lever may be attached independently of the power means of this invention, so that the brake may be actuated either by the operator or by power.

The brake mechanism shown comprises a drum 16 fixed upon the propeller shaft 17 and encircled by a contractible band 18 controlled, as is usual, by a bell crank 19 to which is attached an actuating cable 20 connected to one end of an equalizing bar 21 to which the pull rod 15 is attached. The cable 22 leads from the opposite end of the bar 21 to a crank arm 23 fixed upon a rock shaft 24 which carries at each end a crank arm 25, 26 from which lead to the brakes of the forward wheels (not shown) of the vehicle pull rods or cables 27, 28.

The pull rod 15 may be attached in the usual manner to a pedal (not shown), and it is also connected, for the purposes of this invention, by means of a cable 29 with the stem 30 of the piston 31 working in a cylinder 32. This cylinder is shown as located under the bonnet X and as being supported by the front board or plate 33, a position which facilitates the connection therewith of the controlling means hereinafter described.

Being so positioned, the cable 29 leading to the brake lever system is changed in its direction by turning about a sheave 34, which in the embodiment shown may be carried by the steering column of the vehicle.

The lower end of the cylinder 32 is open and its upper end 35 is closed. A minus pressure being produced in the upper end portion of the cylinder, its piston 31 is forced upwardly by atmospheric pressure, thereby drawing up the brake band as 18 or in common parlance setting the brakes.

A helical spring 36 interposed between the piston 31 and the closed end 35 of the cylinder forces the piston downwardly upon the restoration of atmospheric pressure above it, relieving the usual brake retracting springs of this additional duty.

The piston 31 is provided with suitable packing for rendering it air tight. As shown, such packing comprises a ring 37 of flexible material clamped to the lower face of the piston by means of a metallic ring 38 and extending downwardly along the cylinder wall. The ring 38 is provided with a downstanding flange 39 and between this flange and the depending portion of the packing ring 37, there is located an expansible spring 40, which urges the packing against the walls of the cylinder. The lower end of the flange 39 is offset outwardly to the wall of the cylinder and then downwardly as shown at 41, and when the piston is in its lowest position, comes into engagement with a stop ring 42 secured to the lower end of the cylinder wall. This stop ring has at its inner margin an upstanding flange 43 forming a pocket which may be supplied with lubricant, into which the lower end of the ring 38 dips at each downward stroke of the piston, thereby insuring proper lubrication of the parts and maintaining the packing in soft and pliable condition.

From the upper end of the cylinder 32, there leads a pipe 44, which communicates, through a valve casing 45, with the chamber of a vacuum tank 46, suitably supported, as by being attached to the wall 33, as shown.

A pipe 47 connects the tank 46 with the combustion chamber of the vehicle motor 48. Where, as is usual, this motor comprises a plurality of cylinders, the connection between the tank 46 and the motor may be with one cylinder only, though obviously it may be associated with others as well. This connection is made in such manner that the suction stroke only of the motor piston will be effective on the tank 46.

The connection may be made through the shell of a spark plug 49 screwed into the usual spark plug opening in the cylinder head. The spark plug shell is provided with a lateral nipple 52 to which a valve casing 53 is attached, this casing being provided with a lateral extension 54 with the chamber of which the pipe 47 communicates. A poppet valve 55 is seated in a side wall of the body of the valve casing and opens inwardly to the chamber thereof controlling the communication with the chamber of the extension 54. The stem 56 of the valve projects into this and carries a light spring 57 which normally holds the valve to its seat.

The valve casing may be attached to the casing 49 by means of a bolt 58 passing longitudinally through its chamber and being threaded into the nipple 52, the head of the bolt forming a closure for the outer end of the valve casing and suitable gaskets being placed at each end thereof to prevent leakage. The shaft of the bolt 58 is of less diameter than such chamber of the casing, is recessed from its inner end as shown, and is provided with lateral ports as 59.

The suction stroke of the motor piston will lift the valve 55 from its seat and thus develop a minus pressure in the tank 46. During the remainder of the cycle of the motor, the valve is seated.

The tank 46 has no opening other than the pipe 47 except a port 60 communicating with the valve casing 45. This valve casing, which conveniently may be cast integrally with the tank 46, as shown, is cylindrical in form, and within it is located a balanced piston valve comprising the heads 61, 62 fixed upon a common stem and movable, the latter to cover the port 60 or to open it to communication with the port to which the pipe 44 is connected, and the former to close an external port 77 when the port 60 is uncovered.

An extension 63 of the stem of this valve projects through the vehicle wall 33 and carries at its outer end a nut 64 between which and the wall 33 reacts an expansion spring 65 for normally holding the valve in the position shown in Fig. 1 for closing the port 60 and thereby maintaining within the tank 46 the minus pressure developed by the action of the motor and opening the port 77 to the upper end of the cylinder 35. A lever 66 pivoted at 67 to a suitable bracket attached to the wall 33 bears against the outer end of the valve stem 63. The lower end of this lever is curved outwardly, or away from the wall 33, as shown at 68, and is located directly above the usual accelerator button 69 by which the operator may open the throttle valve 70 of the motor. This throttle control being common to all motor vehicles of the type under consideration, its details are not illustrated.

The spacing of the lateral extension 68 of the lever 66 from the accelerator button is such as to permit the insertion of the operator's toe between them, thereby enabling him to control the motor by downward pressure, or swing the lever on its pivot by upward movement of the foot. A pad of leather or other soft material may be applied to the foot engaging face of the lever extension.

Preferably, the lever 66 is yieldingly held in contact with the valve stem as by means of spring 71 coiled about a rod 72 pivotally attached to the wall 33 and carrying at its outer end a nut forming a seat for the spring and by means of which its tension may be adjusted. By this arrangement, the lever is saved from distortion by any accidental downward blow upon its lower end. The lever 66 may also be provided with a joint 73 provided with a clamping bolt of common form, thereby permitting the adjustment of the lower end of the lever relatively to the accelerator to suit the convenience of the operator.

The outer end of the bore of the casing 45 is enlarged and within it plays a piston head 74 which is fixed upon an extension of the valve stem. A duct 75 connects the chamber between the heads 62 and 74 with a source of minus pressure. As shown, this duct is cored in the wall of the casing and communicates with the pipe 44.

Upon the opening of the port 60, pressure within the last named chamber is lowered, and because of the larger area of the head 74, the valve is urged to closed position by atmospheric pressure, in opposition to the pedal pressure and the resistance of the spring 78 which is incorporated into and forms a part of the valve stem.

In practice, the operator will usually open the port 60 to a greater extent than is necessary for a light application of the brake, and this is desirable in order to immediately take up the slack in the connections, but by the action just described the valve head 62 is instantly moved inward, slightly compressing the spring 78 against the pedal pressure and enabling the operator to fully control the brake application. When the valve 61 uncovers the port 77, the pressure in the chamber between the valve 62 and the head 74 is restored to atmospheric, and the valve 61, 62 is again advanced by the reaction of the spring 78, assuming that the pedal pressure continues.

An adjusting screw 76 may be set through the wall of the valve casing, its inner end extending into the duct 75 thereby providing for the regulation of this passage.

Provision is made for insuring the presence in the motor cylinder of an explosive mixture even though a considerable quantity of air may be drawn in through the brake connections, thereby obviating the danger of stalling the engine upon the application of the brakes.

While this may be accomplished in other ways, a simple and efficient means is shown and consists of a by-pass around the throttle valve 70 controlled by an extension of the stem of the valve 61, 62. This by-pass comprises the tubes 80 and 81 connected to the intake passage of the motor respectively above and below the throttle valve and leading to an extension 82 of the valve casing 45, the adits of the tubes being controlled by a pair of valve heads 83, 84 fixed on an extension of the valve stem 63 and so arranged that when the stem is moved inwardly, the two pipes are brought into communication, and when in its outer position, their connection is cut off.

The means for effecting the release of the clutch as the brakes are set up comprises a piston 85 reciprocating in a cylinder 86 and connected by means of a flexible cable or wire 87 with the clutch pedal 88 to which it is suitably attached as by means of a clevis 89. The outer end of the cylinder 86 is open and may be crossed by a bridge piece 90 to provide a guide for the connector 87. The inner end of the cylinder 86 is connected to the pipe 44 by means of a pipe 91 leading to a valve casing 92, and a pipe 93 extending from this casing to the pipe 44. A valve 94 within the casing 92 is arranged to normally close communication between the pipes 91, 93 and to open such communication in connection with the application of the brakes. To this end, the valve is attached to the stem of the core of a vertical solenoid 95 which by its weight normally holds it in closed position.

The coil of the solenoid is connected by a wire 96 into the circuit of a storage battery 97, always present in motor vehicles as now constructed, and by means of a wire 98 to a contact bar 99 attached to but insulated from the stop ring 42 of the cylinder 32. A contact element, shown as in the form of a plate 100 slidingly mounted upon but insulated from the piston rod 30 and yieldingly supported as by means of a spring 101 is so positioned that upon the upward movement of the piston 31, it engages the bar 99 and also a similar bar 102 carried by the ring 42 and constituting a ground connection.

When the valve 94 is closed, it uncovers a relief port 103 admitting atmosphere to the forward end of the cylinder 86 and permitting the re-engagement of the clutch. A spring 104 is shown as interposed between the piston 85 and the end of the cylinder for moving backwardly the piston without imposing additional load upon the clutch spring.

Provision is made also for rendering the clutch release mechanism effective only at certain speeds of the vehicle, as by connecting the bar 102 with a grounding switch carried by an element movable responsive to the vehicle speed, such as the drum of the speedometer in common use. For this purpose, the contact bar 102 is insulated from the stop ring 42 and is connected by means of a wire 105 to a binding post 106 attached to and projecting through the casing of the vehicle speedometer 107.

The inner end of the post 106 is positioned for engagement by a yielding contact strip 108 attached to the revolving drum 109 of the speedometer. The last named element may be so located on the drum as to contribute to the closing of the solenoid circuit at any predetermined vehicle speed.

In applying the brakes, the operator will ordinarily open the valve controlling the vacuum chamber sufficiently to cause a quick movement of the piston 31 to take up the slack in the brake connections. If less than full application is desired, the valve will be automatically moved backwardly by atmospheric pressure on the piston head 74, compressing the spring 78 if the lever pressure continues. Upon the closing of the port 60 and opening of the port 77, atmospheric pressure is restored to the chamber between the heads 62 and 74 and the spring 78 again advances the valve. While a light brake application is thus actually intermittent, the variations are so rapid as to render it practically constant. Should a heavy brake application be desired, sufficient foot pressure may be employed to overcome the atmospheric pressure on the head 74.

The invention provides for the control of the vehicle by the mere down and up movement of one foot of the operator, as effectively as has heretofore been secured by the use of both feet, one of them being shifted laterally from the accelerator to the brake pedal. As heretofore, light brake applications are made against the power of the engine, and when full application is desired, the danger of stalling the engine as the vehicle comes to rest is obviated by insuring the release of the clutch.

Furthermore, the danger of stalling the engine upon the application of the brakes, inherent in vacuum brake systems heretofore in use, by unduly impoverishing the fuel mixture is obviated, and a sufficiently strong engine action to maintain the required vacuum for continuous control of the brakes is insured.

The various parts are so related and disposed as to render the device applicable to substantially all prevailing makes of motor driven vehicles, without requiring their reorganization, and at small expense.

I claim as my invention:

1. In a vehicle, in combination an internal combustion motor, having a throttle valve, a brake system, a fluid motor for actuating the brake system, a valve controlling the last named motor, a by-pass around the throttle valve, and a valve controlling the by-pass and openable by the opening of the fluid motor controlling valve.

2. In a vehicle in combination, an internal combustion motor having a throttle valve, a brake system, a vacuum motor for actuating the brake system, a vacuum chamber connected with both motors, a valve controlling the connection between the chamber and the vacuum motor, a by-pass around the throttle valve, and a valve controlling the by-pass and positively connected with the vacuum motor valve and openable therewith.

3. In a vehicle in combination, an internal combustion engine, mechanism for connecting the engine with the running gear of the vehicle, a vacuum motor for breaking such connection, a vacuum chamber associated with the engine, connection between the chamber and the motor, a valve in the last named connection, an electromagnet for opening such valve, a speedometer, and a switch in the circuit of the electro-magnet controlled by the speedometer.

4. In a vehicle, in combination, an internal combustion engine, a speedometer, a brake system, mechanism for connecting the engine with the running gear of the vehicle, a vacuum motor for breaking such connection, a vacuum motor for actuating the brakes, a vacuum chamber associated with the engine, connection between both motors and the chamber, a normally closed valve for controlling such connection to the first named motor, electro-magnetic means for opening such valve, a circuit breaker in the circuit of the magnet closed by the power stroke of the second named motor, and a switch in the said circuit controlled by the speedometer.

5. In a vehicle, in combination, an internal combustion engine, a brake system, power means for actuating such system, mechanism connecting the engine with the running gear of the vehicle, and power means controlled conjointly by the first named power means and the speedometer for breaking such connection.

6. In an automotive vehicle, in combination, a motor for driving the vehicle, a lever for controlling the connection of the motor with the running gear of the vehicle, a brake system, a vacuum motor for actuating the brakes, a motor for releasing the lever, electric means for controlling the last named motor, and a switch controlling the electric means and actuated by the vacuum motor.

7. In an automotive vehicle in combination, a motor for driving the vehicle, a brake system, a vacuum motor for actuating the brakes, a lever for controlling the connection between the vehicle motor and the running gear of the vehicle, a motor for actuating the lever, electric means for controlling the last named motor, two switches in the circuit of the electric means, one thereof being controlled by the vacuum motor and the other being controlled by the speed of the vehicle.

NATHAN M. LOWER.